United States Patent
Arabaci et al.

(10) Patent No.: US 11,159,243 B2
(45) Date of Patent: *Oct. 26, 2021

(54) SYSTEMS AND METHODS FOR CREATING IN A TRANSMITTER A STREAM OF SYMBOL FRAMES CONFIGURED FOR EFFICIENT PROCESSING IN A RECEIVER

(71) Applicant: VIASAT, INC., Carlsbad, CA (US)

(72) Inventors: Murat Arabaci, Parma, OH (US); Fan Mo, Hinckley, OH (US); Sameep Dave, Hinckley, OH (US); William H. Miller, Ravenna, OH (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/983,226

(22) Filed: Aug. 3, 2020

(65) Prior Publication Data

US 2021/0021350 A1    Jan. 21, 2021

Related U.S. Application Data

(63) Continuation of application No. 16/132,325, filed on Sep. 14, 2018, now Pat. No. 10,778,339.

(51) Int. Cl.
| | | |
|---|---|---|
| H04L 12/28 | (2006.01) | |
| H04B 10/556 | (2013.01) | |
| H04B 10/54 | (2013.01) | |
| H04B 10/61 | (2013.01) | |
| H04L 27/38 | (2006.01) | |

(52) U.S. Cl.
CPC ....... *H04B 10/5561* (2013.01); *H04B 10/541* (2013.01); *H04B 10/612* (2013.01); *H04L 27/3809* (2013.01)

(58) Field of Classification Search
None
See application file for complete search history.

(56) References Cited

U.S. PATENT DOCUMENTS

| | | | |
|---|---|---|---|
| 6,088,411 | A | 7/2000 | Powierski et al. |
| 6,546,041 | B1 | 4/2003 | Fujimoto |
| 7,050,419 | B2 | 5/2006 | Azenkot et al. |
| 7,161,988 | B2 | 1/2007 | Lee et al. |
| 7,369,633 | B2 | 5/2008 | Jiang et al. |

(Continued)

FOREIGN PATENT DOCUMENTS

| | | |
|---|---|---|
| EP | 1993252 A1 | 11/2008 |
| EP | 2211514 A1 | 7/2010 |
| WO | 2017/095909 A1 | 6/2017 |

OTHER PUBLICATIONS

Aboltins, et al., Synchronization for OFDM Based Communication System: a Brief Overview, Conference Paper Jan. 2009.

(Continued)

*Primary Examiner* — Elisabeth Benoit Magloire

(57) ABSTRACT

A system and method of creating frames comprised of blocks, where each block comprises data symbols corresponding to a higher order quadrature modulation format and support symbols corresponding to a lower order modulation format. One or more of the blocks can further comprise markers comprising distinct symbol patterns. The markers can mark the start of each frame and/or another location in the frame. The support symbols can be in a common location in each block.

28 Claims, 8 Drawing Sheets

(56) References Cited

U.S. PATENT DOCUMENTS

| | | | |
|---|---|---|---|
| 7,512,154 B2 | 3/2009 | Quigley et al. | |
| 7,515,714 B2 | 4/2009 | Orihashi et al. | |
| 8,411,552 B2 | 4/2013 | Kim et al. | |
| 8,977,191 B2 | 3/2015 | Jong et al. | |
| 9,106,364 B1* | 8/2015 | Singleton | H04K 1/00 |
| 9,385,843 B2 | 7/2016 | Khandekar et al. | |
| 2001/0034867 A1* | 10/2001 | Jaffe | H04L 1/0045 |
| | | | 714/746 |
| 2006/0153227 A1* | 7/2006 | Hwang | H04L 1/1812 |
| | | | 370/465 |
| 2006/0203713 A1* | 9/2006 | Laroia | H04L 27/0008 |
| | | | 370/209 |
| 2007/0058742 A1 | 3/2007 | Demarco et al. | |
| 2007/0081484 A1 | 4/2007 | Wang | |
| 2007/0189402 A1* | 8/2007 | Yang | H04L 25/025 |
| | | | 375/260 |
| 2009/0125780 A1* | 5/2009 | Taylor | H04L 1/0071 |
| | | | 714/752 |
| 2009/0268837 A1* | 10/2009 | Kimura | H04L 25/022 |
| | | | 375/267 |
| 2010/0309384 A1* | 12/2010 | Asjadi | H04L 27/2656 |
| | | | 348/725 |
| 2010/0316144 A1 | 12/2010 | Sun et al. | |
| 2011/0033051 A1* | 2/2011 | Steer | H04K 3/25 |
| | | | 380/270 |
| 2012/0027147 A1* | 2/2012 | Ray | H04L 25/0307 |
| | | | 375/359 |
| 2012/0307936 A1* | 12/2012 | Murakami | H04B 7/0413 |
| | | | 375/295 |
| 2013/0003887 A1* | 1/2013 | Murakami | H04L 1/0003 |
| | | | 375/285 |
| 2013/0151241 A1* | 6/2013 | Park | G10L 19/018 |
| | | | 704/200.1 |
| 2013/0163653 A1* | 6/2013 | Hirschmann | H04B 17/00 |
| | | | 375/224 |
| 2013/0330082 A1* | 12/2013 | Perez De Aranda Alonso | |
| | | | H04J 14/08 |
| | | | 398/98 |
| 2014/0133856 A1* | 5/2014 | Boyd | H04Q 11/0071 |
| | | | 398/58 |
| 2014/0177762 A1* | 6/2014 | Gotman | H04B 14/002 |
| | | | 375/340 |
| 2014/0255029 A1 | 9/2014 | Varanese et al. | |
| 2014/0335873 A1 | 11/2014 | Yu et al. | |
| 2016/0006593 A1* | 1/2016 | Asjadi | H04L 27/2611 |
| | | | 375/295 |
| 2016/0056918 A1 | 2/2016 | Miller | |
| 2016/0142179 A1 | 5/2016 | Fludger et al. | |
| 2016/0182189 A1 | 6/2016 | Stadali et al. | |
| 2017/0005752 A1 | 1/2017 | Murakami et al. | |

OTHER PUBLICATIONS

Falconer, et al., "Frequency Domain Equalization for Single-Carrier Broadband Wireless Systems" Wideband Wireless Access Technologies to Broadband Internet IEEE Communications Magazine, Apr. 2002.

Tang, et al. "Iterative Channel Estimation for Unique-Word Based Single-Carrier Block Transmission" Tsinghua National Laboratory for Information Science and Technology (TNList) Tsinghua University, Beijing 10084, P.R. China.

Thomas J. Kolze, "Upstream HFC channel modeling and physical layer design" Proceedings vol. 2917, Broadband Access Systems; (1996); doi:10.1117/12.257332 Event: Photonics Ease '96, 1996, Boston, MA, United States.

IP Core Technology Development and License Agreement No. TG20161121.

Agreement No. 01 to IP Core Technology Development and License Agreement No. TG20161121—IPC0134—Amendment No. 01.

"IP Core Development & License Agreement No. 20161121" Exhibit B Specifications, ViaSat, Customer Coherent Transceiver IP Core (Rev.A dated Jul. 31, 2017).

"IP Core Development & License Agreement No. 20161121" Exhibit C, ViaSat—Customer Netlist Criteria (Dec. 16, 2016) (redacted), 20 pages.

International Search Report for corresponding PCT/US2019/050617 dated Nov. 15, 2019.

\* cited by examiner

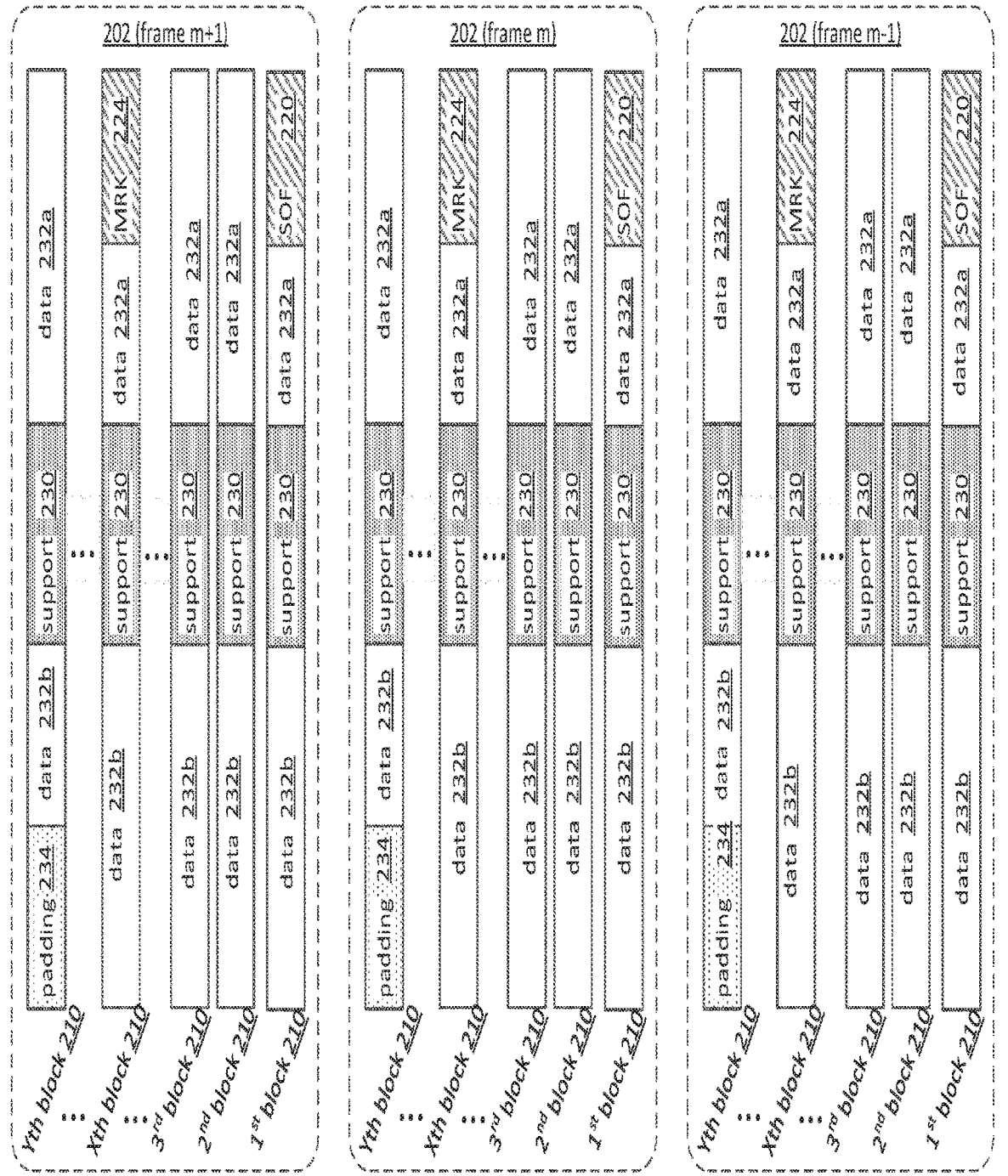

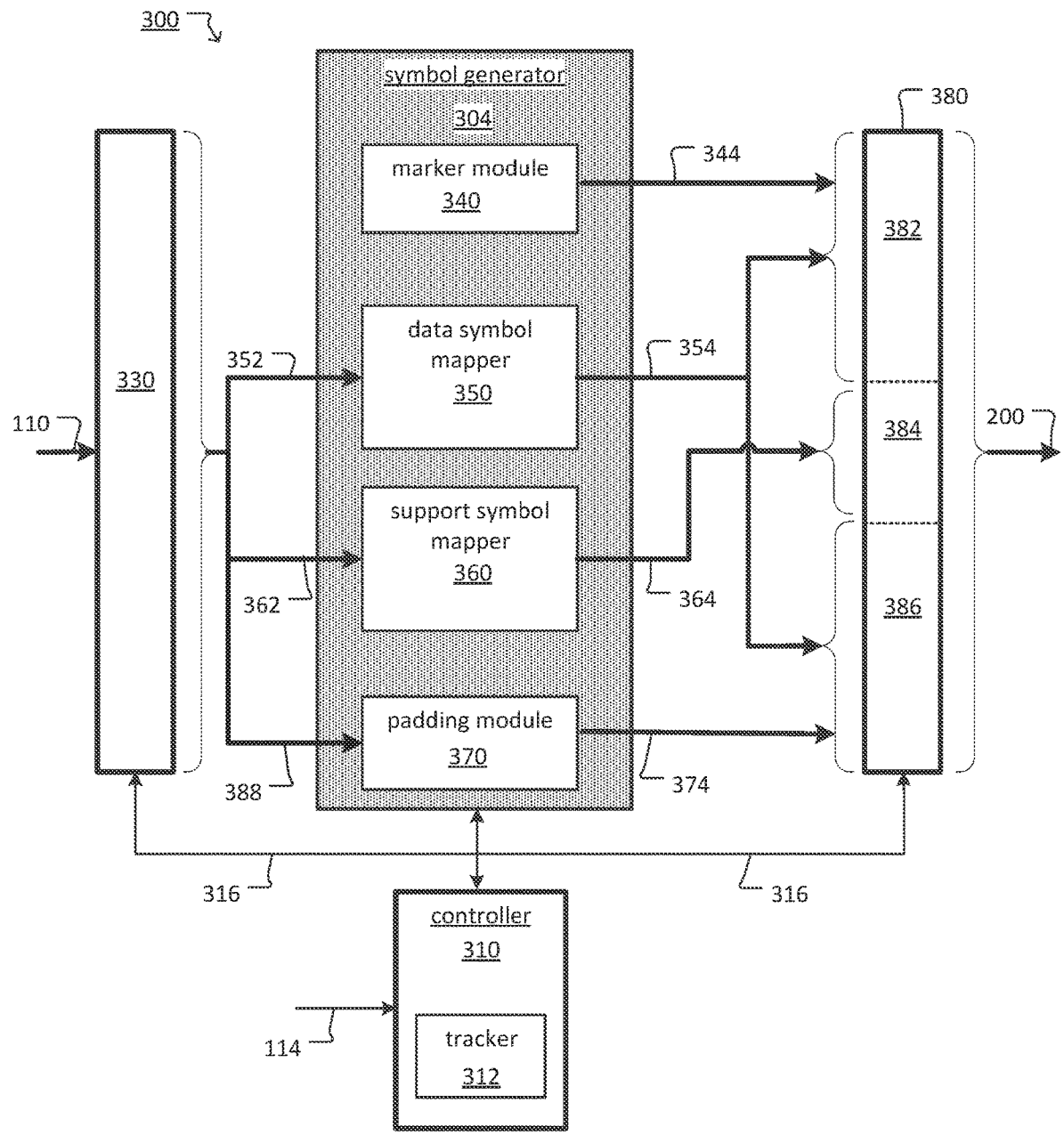

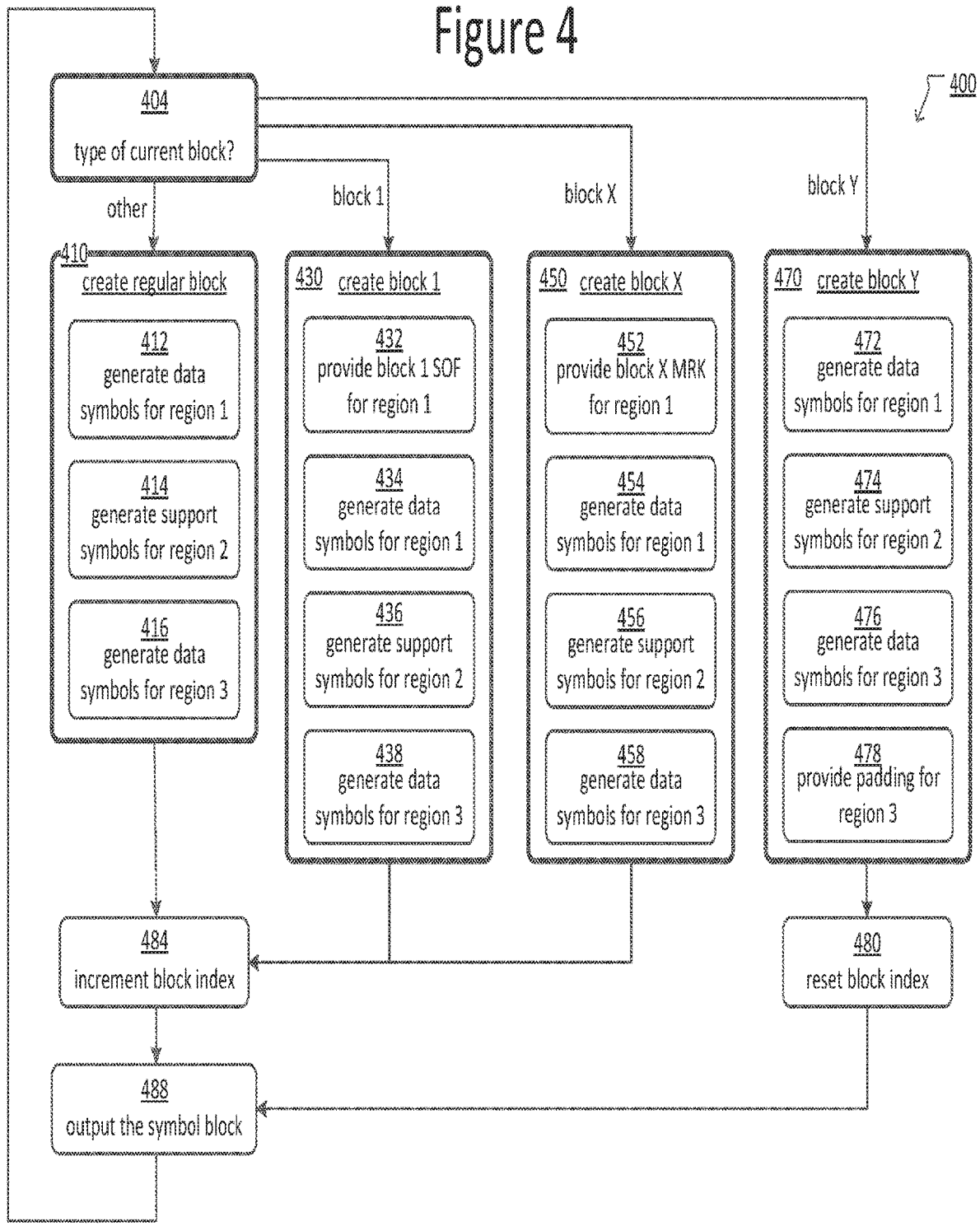

SYSTEMS AND METHODS FOR CREATING IN A TRANSMITTER A STREAM OF SYMBOL FRAMES CONFIGURED FOR EFFICIENT PROCESSING IN A RECEIVER

RELATED APPLICATIONS

This application claims priority from U.S. patent application Ser. No. 16/132,325, filed 14 Sep. 2018, which is incorporated herein in its entirety.

BACKGROUND

The demand for high-throughput data transmission is ever increasing. For example, the need has been growing in the industry to transmit increasingly larger quantities of data at increasingly faster speeds. This has given rise to the need to improve the efficiency of process both in the transmitter and the receiver. Embodiments of the present invention organize symbols representing multiple bits into parallel symbol blocks, which form frames for transmission to a receiver. Attributes of the frames can provide processing advantages.

BRIEF DESCRIPTION OF THE DRAWINGS

FIG. 2 illustrates an example of streams of frames each comprising symbol blocks according to some embodiments of the invention.

FIG. 3 shows an example of a framer according to some embodiments of the invention.

FIG. 4 illustrates an example of a method by which a framer can operate according to some embodiments of the invention.

DETAILED DESCRIPTION OF EXEMPLARY EMBODIMENTS

This specification describes exemplary embodiments and applications of various embodiments of the invention. The invention, however, is not limited to the exemplary embodiments and applications or to the manner in which the exemplary embodiments and applications operate or are described herein. Moreover, the figures may show simplified or partial views, and the dimensions of elements in the figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. If used with respect to a numerical value or range, substantially means within ten percent. The term "ones" means more than one.

Figure 1:
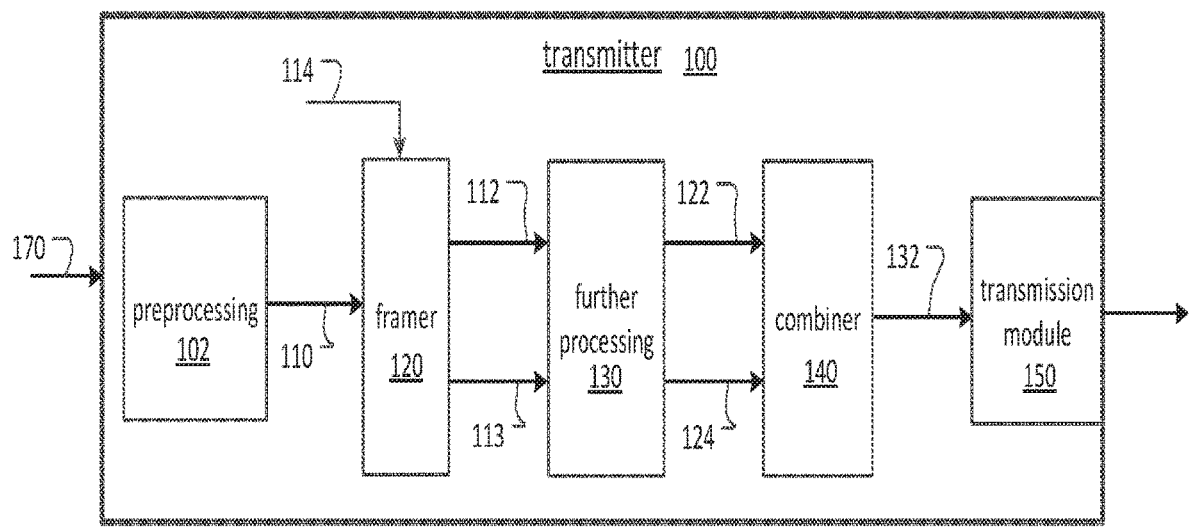
FIG. 1 illustrates an example of a telecommunications transmitter according to some embodiments of the invention.

FIG. 1 illustrates an example of a communications transmitter 100 for mapping user bits into quadrature modulated symbols, organizing the symbols into frames comprising symbol blocks, and transmitting the frames to a remote communications receiver (not shown). Although not shown, the transmitter 100 can comprise a digital signal processing (DSP) circuitry to perform various DSP operations, digital-to-analog converters (DACs), and supporting analog circuitry (e.g., amplifiers, multiplexers, couplers, etc.) The frames cleverly organize the symbols to facilitate speedy and efficient processing both at the transmitter 100 and the receiver (not shown).

As shown, a communication or client information (e.g., a message, a file, a multi-media object, a web page, or the like) 170 to be sent to a remote receiver (not shown) is processed (represented generically by preprocessing 102) to produce digital data in the form of bits 110 for transmission to the remote receiver (not shown). The bits 110 are sometimes referred to herein as user bits or client bits. The preprocessing 102 can include functions such as encoding (e.g., source encoding and channel encoding), encryption, and/or the like. In some embodiments, the preprocessing 102 can receive bits at its input eliminating rather than or in addition to the client information 170.

A framer 120 can map the bits 110 into symbols and organize the symbols into frames each comprising multiple blocks of symbols. The framer 120 can thus be understood a module of the transmitter 100 that performs bit parsing, bit-to-symbol mapping, and/or symbol reformatting using the bits output by the preprocessing 102 to generate so-called "waveform frames," which can be actual frames of symbols to be transmitted over a communications medium (not shown) to a receiver (not shown). The framer 120 can thus be a waveform framer.

As shown, the framer 120 can produce from the bits 110 multiple streams of frames 112 and 113 (sometimes referred to herein as "frame streams"). In the example illustrated in FIG. 1, the framer 120 produces a first frame stream 112 and a second frame stream 113. Each of the frame streams 112 and 113 can undergo further digital and analog processing 130, which can result in the first frame stream 112 being modulated onto a first carrier signal 122 and the second frame stream 113 being modulated onto a second carrier signal 124. A combiner 140 can combine the carrier signals 122 and 124 into a composite signal 132, which can be launched by a transmission module 150 into a channel or communications medium (not shown) for transmission to a receiver (not shown).

The composite signal 132 can be a communications signal. For example, composite signal 132 can be a baseband communications signal or any type of bandpass communications signal including a modulated optical signal or any other type of modulated electromagnetic signal whether transmitted wirelessly or over a physical medium such as a fiber, a cable, etc. For example, the composite signal 132 can be a dual-polarization optical signal in which the carrier signals 122 and 124 can be mutually orthogonal optical signals. For example, the first carrier signal 122 can be a horizontally polarized optical signal, and the second carrier signal 124 can be a vertically polarized optical signal. The transmission module 150 can be a module comprising various transmitter front-end elements, e.g., an amplifier, a multiplexer, a fiber pigtail, a coupler, an antenna, or the like), which can couple or launch the composite signal 132 into the channel or the communications medium for transmission.

The framer 120 can map the bits 110 into quadrature symbols. As is known, a quadrature symbol comprises an in-phase (I) component and a quadrature (Q) component. As is also known, the I and Q component pairs for each symbol can be carried on separate signals (not shown). Thus, the first stream 112 can comprise two signals (not shown): one signal (not shown) carrying the I components of the symbols, and another signal (not shown) carrying the corresponding Q components. Similarly, the second stream 113 can also comprise I and Q signals (not shown). For ease of illustration and discussion, however, descriptions herein are made in reference to symbols, but it is to be understood that each symbol can comprise an I/Q component pair and any signal or stream of symbols can comprise two signals or streams one carrying the I components and the other carrying the corresponding Q components of the symbols. Thus, any stream of symbols, whether a stream of individual symbols, a stream of symbol blocks, or a stream of frames, though depicted or discussed herein in terms of a single symbol entity can comprise two streams or signals in which one stream or signal comprises the I components and another stream or signal comprises the Q components. In general, each symbol can comprise any number of predetermined components (or dimensions). For example, symbols associated with multi-dimensional modulation formats, whose number of dimensions is greater than two, will have as many components as the number of dimensions of the underlying modulation format. As an example, while a two-dimensional modulation format can be defined in a two-dimensional space spanned by quadrature signals (e.g., I and Q), a three-dimensional modulation format can be defined over a three-dimensional space spanned an additional dimension to I and Q, e.g., time, space, etc. However, without loss of generality, symbols are described herein as multi-component (or multi-dimensional) symbols having two components (or dimensions), i.e., I and Q.

Many different quadrature modulation formats are known including phase shift keying (PSK) and quadrature amplitude modulation (QAM) formats. Examples of quadrature modulation formats include QPSK, 8-PSK, 8-QAM, 16-PSK, 16-QAM, 32-QAM, 64-QAM, 128-QAM, 256-QAM, and the like. The foregoing or other known or later developed quadrature modulation formats can be utilized in embodiments of the invention. As is known, the "order" of a quadrature modulation format corresponds to the number of different symbols in the format's symbol constellation. The smaller the number of symbols in the constellation the lower the order, and the greater the number of symbols in the constellation the greater the order. Also, the greater the order, the greater the number of bits 110 each symbol represents.

The transmitter 100, and hence, its DSP circuit (not shown), and hence, the framer 120 comprised by the DSP can support several predetermined operating modes identified by an operating mode identifier signal 114. As described herein, the term the "supported operating modes" describe several predetermined operating modes that a DSP of a transmitter comprising the framer 120, and hence, the framer 120 system itself, can be configured to operate at. Similarly, the "selected operating mode" is used herein to describe the selected one of the supported operating modes. Each one of the supported operating modes is associated with a first plurality of modulation formats and a second plurality of modulation formats to be used in generating different types of symbols from bits 110, as described in greater detail herein. The term "supported modulation format(s)" is understood herein to refer to the superset of the modulation format(s) associated with the supported operating modes. The term "selected modulation format(s)" is understood herein to correspond to the modulation format(s) associated with the selected operating mode as identified by the signal 114.

The framer 120 can be configured to map some of the bits 110 into any of several supported modulation formats associated with the selected operating mode as identified by the signal 114. For example, in some embodiments, the framer 120 is capable of mapping some bits 110 into the selected first and second plurality of modulation formats associated with the operating mode as identified by the signal 114. Without loss of generality and for brevity of discussion, however, each operating mode is described herein as being associated with a first modulation format and a second modulation format. Moreover, the second modulation format is described herein as being the same for all supported operating modes. For example, the selected first modulation format and the second modulation format can each be any of the QAM formats listed above. For example, the second modulation format can be a lower order than each of the supported first modulation formats. The second modulation format can be, for example, QPSK, while each of the supported first modulation formats can be any of QAM formats with order greater than QPSK.

FIG. 2 illustrates an example of a frame stream 200 that can be generated by the framer 120. The first frame stream 112 and/or the second frame stream 113 in FIG. 1 can be like frame stream 200.

As shown, the frame stream 200 can comprise frames 202 each of which can comprise a fixed number Y of symbol blocks 210. Each symbol block 210 can comprise a fixed number N of symbols (which can facilitate parallel processing in the transmitter 100 and/or the receiver (not shown)). The numbers Y and N can be constant for every supported operating mode.

As noted, a quadrature modulated symbol comprises an I/Q component pair. The stream 200 can thus comprise two similar streams of frames (not shown): one carrying the I components of each symbol, and the other carrying the corresponding Q components of each symbol. For ease of discussion and simplicity, however, the stream 200 is illustrated as a single stream carrying symbols, but it is to be understood that each symbol comprises an I and a Q component.

As shown, each symbol block 210 can comprise data symbols 232, support symbols 230, marker symbols SOF 220 and MRK 224, and padding 234. The data symbols 232 can correspond to bits 110 mapped in accordance with the selected first modulation format, and the support symbols 230 can correspond to others of the bits 110 mapped in accordance with the second modulation format.

As shown, the support symbols 230 can be in approximately the same location in every block 210 in a frame 202. The exact start index of the support symbols 230, e.g., with respect to the beginning of each block 210 that contains the support symbols 230, and the number of support symbols 230 can be predetermined and can vary depending on the selected operating mode. Similarly, the exact start index of the data symbols 232, e.g., with respect to the beginning of each block 210 that contains the data symbols 232, and the number of data symbols 232 can be predetermined and can vary depending on the selected operating mode.

Moreover, one or more of the blocks 210 in a frame 202, e.g., SOF 220 and MRK 224, can include special markers comprising distinct patterns of symbols. It is noted that what is sometimes referred to as a unique word in the industry is an example of such a special marker. The symbols of the special markers can correspond to the second modulation format or a modulation format that is different than both the first modulation format and the second modulation format. The symbols of a special marker typically do not correspond to any of bits 110.

In the example shown in FIG. 1, the first block 210 and the $X^{th}$ block 210 in a frame 202 include such special markers. For example, the first block 210 can include the start-of-frame SOF 220 symbol pattern that marks the start of each frame 202. The $X^{th}$ block 210 of a frame 202 can include the intermediate marker MRK 224 symbol pattern, which can serve any number of purposes including marking a particular location (e.g., an approximately middle) of the frame 202. The SOFs 220 in all of the frames 202 in the stream 200 can be the same, and the MRKs 224 can likewise be the same in all the frames 202 in the stream 200. The SOFs 220 and MRKs 224 can, however, be different from each other. If the framer 120 produces more than one frame stream such as the first frame stream 112 and second frame stream 113 shown in FIG. 1, the SOFs 220 and MRKs 224 in one stream (e.g., 112) can be different than the SOFs and MRKs in another stream (e.g., 113). Moreover, as noted, the first frame stream 112 can be decomposed into a first frame stream I (not shown) and a first frame stream Q (not shown), which carry I and Q components of respective symbols of the first frame stream 112, respectively. Similarly, the second frame stream 113 can be decomposed into a second frame stream I (not shown) and a second frame stream Q (not shown). In such cases, the SOFs 220 and MRKs 224 in each component stream (e.g., I stream of 112, Q stream of 112, I stream of 113 and Q stream of 113) can be different from one another. Each operating mode can be associated with a distinct set of symbol patterns of SOFs 220 and MRKs 224. For example, the start index of the SOFs 220 and MRKs 224 can be the same regardless of the selected operating mode. For example, the SOFs 220 and MRKs 224 can have a start index of one as they are located at the beginning of each block that they are contained in. As another example, as also noted above, the location of SOFs 220 and MRKs 224 in each frame 202 can be the same regardless of the selected operating mode. However, the numbers of symbols contained in the SOFs 220 and the MRKs 224 associated with a given operating mode depend on that operating mode. That is, the SOFs 220 and the MRKs 224 can have a different number of symbols in one supported operating mode compared to another.

As shown, the last ($Y^{th}$) block 210 can comprise padding 234 (e.g., padded symbols) as needed to complete the $Y^{th}$ block 210. For each supported operating mode, the number of bits 110 that can be carried by each frame 202 is a predetermined fixed value. For example, the predetermined number of bits 110 to be carried in each frame 202 for a given operating mode can be determined based on the number of forward error correction (FEC) codewords that can be fit in a frame 202. As also noted, the bits 110 are mapped to the data symbols 232 based on the selected first modulation format and others of the bits 110 are mapped to the support symbols 230 based on the second modulation format. For a selected operating mode as identified by the signal 114, if all the associated predetermined number of bits 110 to be carried in each frame 202 cannot be mapped to the associated predetermined number of data symbols 232 and the associated predetermined number of support symbols 230, then some bits 110 will be left unmapped. Also, due to such mismatch, the last block ($Y^{th}$) 210 of each frame 202 may have some positions left unfilled. Both the number of bits that will be left unmapped and the number of padding bits needed to fill the unfilled positions in the last block 210 of each frame 202 can also be predetermined for each supported operating mode. Therefore, the unmapped bits can be first padded with a predetermined number of padding bits, e.g., randomly generated bits or bits extracted from a known sequence, and the resulting set of bits can then be mapped to data symbols based on the selected first modulation format, and stored in the padding 234 of the last block ($Y^{th}$) 210.

The SOF 220 can comprise a distinct pattern of symbols that can be readily detected, e.g., via correlations, at the receiver (not shown). Hence, the SOF 220 are designed to have desirable auto- and cross-correlation properties to facilitate determining boundaries of frames at a receiver (not shown). In some embodiments, the receiver might perform differential decoding on the received samples (including SOF 220) before initiating its search for frame boundaries to increase resiliency of the frame boundary search process to various impairments and/or distortions. For example, during signal acquisition, the frequency offset present in the signal might hinder access to absolute phase information. Since differential encoding associates transmitted bits with phase transitions rather than absolute phases, such bits can be recovered via differential decoding at the receiver without the need for absolute phases to have been determined. In such embodiments, the SOF 220 can be designed to have desirable auto- and cross-correlation properties when used with and without differential decoding. Using differentially decoded SOFs, a receiver can thus allow a receiver (not shown) to identify the start of frames in the received samples even when the transmission signal is subjected to various impairments and/or distortions.

FIG. 3 illustrates an example configuration (labeled 300 in FIG. 3) of the framer 120. For ease of description, FIG. 3 is discussed as generating frames that correspond to the frames 202 illustrated in FIG. 2. The framer 300, however, is not so limited.

As will be seen, the framer 300 can generate from the bits 110 each block 210 of the frames 202 shown in FIG. 2. For example, each of the first block through the $Y^{th}$ block 210 of a frame 202 can be generated in a framer output 380. For example, the symbols of a SOF 220 or MRK 224 (if present) and the first group of data symbols 232*a* of each block 210 can be provided by a symbol generator 304 to a first region 382 of the framer output 380, the support symbols 230 of each block 210 can be provided by the symbol generator 304 to a second region 384 of the framer output 380, and the second group of data symbols 232*b* of each block 210 and padding 234 (if present) can be provided by the symbol generator 304 to a third region 386 of the framer output 380. As each block 210 is generated, it can be output from the framer output 380, producing the frame stream 200 illustrated in FIG. 2.

In the example shown in FIG. 3, the framer 300 can comprise a controller 310, a framer input 330, a marker module 340, a data symbol mapper 350, a support symbol mapper 360, a padding module 370, and a framer output 380.

The controller 310 can control operation of the framer 300. As shown, the controller 310 can comprise a tracker 312, which can keep track of an index of the current block 210 in a frame 202 that is being created. As also shown, the controller 210 can receive the operating mode identifier signal 114 and determine based on the signal 114 the associated predetermined sizes and locations of each type of symbols in each block 210 of each frame 202 to be generated in a selected operating mode. The controller 310 can issue control signals 316 to other elements of the framer 300 to create a current block 210 in the framer output 380 in accordance with the selected first modulation format as indicated by the signal 114 and the current block index as tracked by the tracker 312.

The framer input 330 can receive bits 110 and provide sets of the bits 110 to an input 352 of the data symbol mapper 350, an input 362 of the support symbol mapper 360, and/or an input 388 of the padding module 370 in accordance with the control signals 316. In some embodiments, the framer input 330 can comprise a buffer for buffering the bits 110.

The data symbol mapper 350 can map bits 110 provided to its input 352 into data symbols in accordance with the selected first modulation format as indicated by the signal 114. An output 354 of the data symbol mapper 350 can selectively provide the data symbols to the first region 382 and/or the third region 386 of the framer output 380. The control signals 316 can control which and how many of the bits 110 from the framer input 330 are provided to the data symbol mapper 350. The control signals 316 can further control the locations within the first region 382 and/or the third region 386 of the framer output 380 to which the data symbols are provided.

The support symbol mapper 360 can map bits 110 provided to its input 362 into support symbols in accordance with the second modulation format. An output 364 of the support symbol mapper 360 can selectively provide the support symbols to the second region 384 of the framer output 380. The control signals 316 can control which and how many of the bits 110 from the framer input 330 are provided to the support symbol mapper 360.

The marker module 340 can selectively provide the symbols of an SOF 220 and/or MRK 224 over its output 344 to the first region 382 in the framer output 380. The marker module 340 can be capable of providing a selected one of multiple different SOFs 220 and/or MRKs 224 based on the control signals 316 which are determined based on the selected operating mode as identified by the signal 114. For example, as noted, each selectable SOF 220 can comprise a different pattern of symbols. Similarly, as noted, each selectable MRK 224 can comprise a different pattern of symbols. The control signals 316 can select a particular one of the available SOFs 220 and/or MRKs 224 to provide to the first region 382. The control signals 316 can also control the location within the framer output 380, and thus the location within the symbol block 210 being created, to which the selected SOF 220 or MRK 224 is provided.

The padding module 370 can selectively provide padding 234 of padded symbols, as described previously, over its output 374 to the third region 386 in the framer output 380. The control signals 316 can control the location within the framer output 380, and thus the location within the symbol block 210 being created, to which the padding 234 is provided.

The framer output 380 can receive outputs 344, 354, 364, and 374 from the marker module 340, data symbol mapper 350, support symbol mapper 360, and padding module 370, respectively, as discussed above. As noted, this output can comprise a newly constructed block 210. The framer output 380 can then output the newly constructed block 210. The controller 310 can control the frame output 380 with control signals 316. In some embodiments, the framer output 380 can comprise a buffer.

FIG. 4 shows an example of a method 400 for constructing a stream of frames from user bits according to some embodiments of the invention. For ease of discussion, method 400 is discussed below with respect to the framer 300 as shown in FIG. 3 operating to produce the exemplary frame stream 200 shown in FIG. 2, but the method 400 is not so limited.

For purposes of simplicity of explanation, the method 400 of FIG. 4 is shown and described as executing serially, but the present invention is not limited by the illustrated order, as some aspects could occur in different orders and/or concurrently with other aspects from that shown and described herein. For example, 412-416 can be performed substantially simultaneously. Acts 432-438 can similarly be performed substantially simultaneously as can 452-458 and/or 472-478.

As noted, the controller 310 can comprise a tracker 312 that keeps track of the block 210 currently being constructed. In the following description of method 400, it is assumed that the tracker 312 maintains an index that identifies the position of the current block 210 in its frame 202. An index is but an example, and the current block 210 can be tracked in other ways.

At 404, the process branches to create the type of the current block to be created. When the block index (e.g., as kept by the tracker 312 of the controller 310) indicates the first block 210, the method 400 branches from 404 to 430.

At 430, the controller 310 controls the framer 300 to create the first block 210 in a frame 202. Acts 432-438 illustrate an example.

Figure 5A:
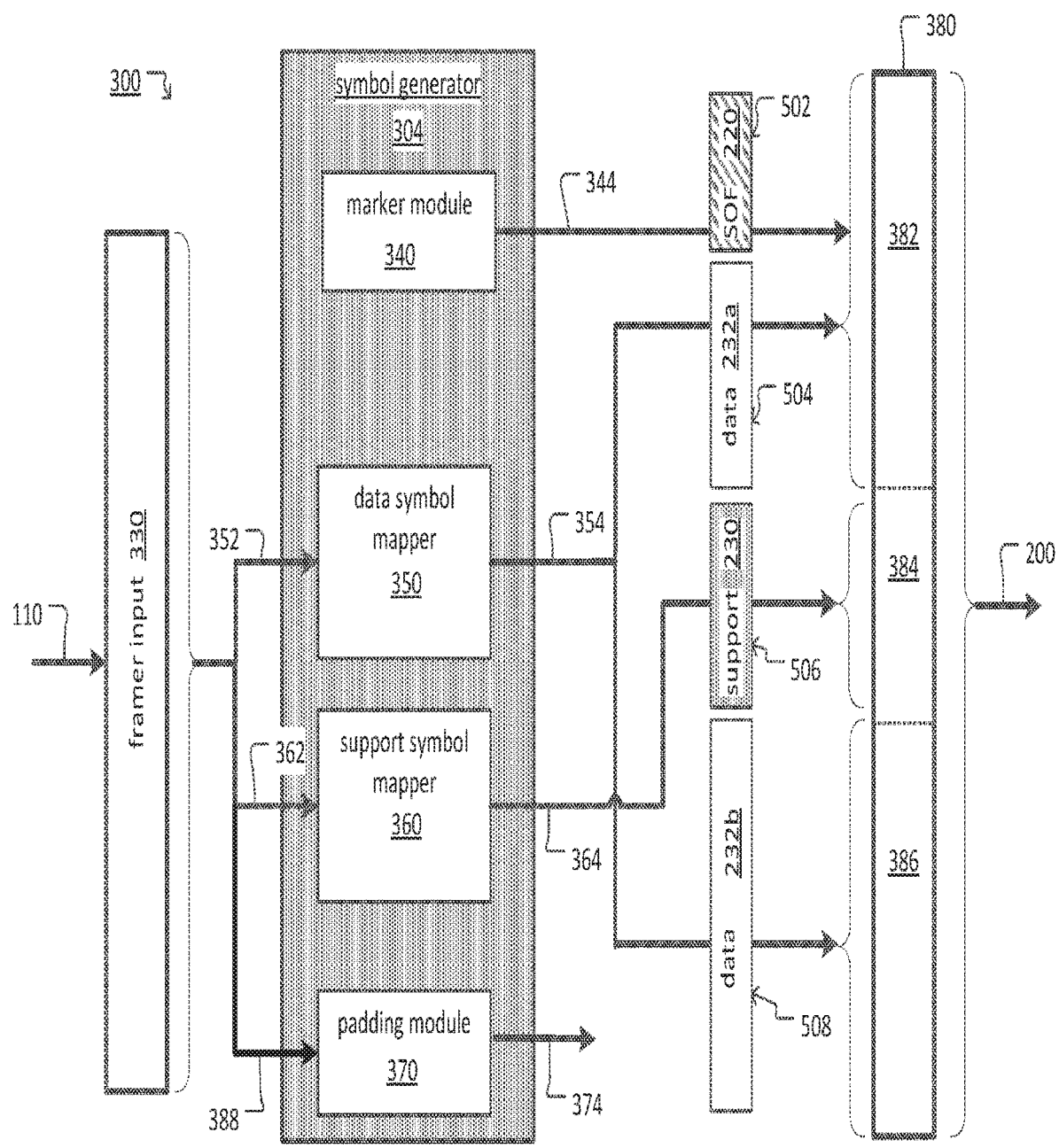
FIGS. 5A-5D show examples relating to the method of FIG. 4 according to some embodiments of the invention.

At 432, the marker module 340 can provide a selected SOF 220 symbol pattern to a selected location in the first region 382 of the framer output 380. The size (e.g., in symbols) of an SOF 220 can vary with the signal 114. The controller 310 can thus provide controls signals 316 that cause the marker module 340 to provide the desired SOF 220 to the desired location in the first region 382 of the framer output 380. An example of an SOF 220 symbol pattern 502 being provided from the marker module 340 to the first region 382 is shown in FIG. 5A.

At 434, a sufficient number of bits 110 for mapping to data symbols to fill the remaining symbol positions in the first region 382 are provided from the frame input 330 to the data symbol mapper 350. The data symbol mapper 350 maps the bits 110 to data symbols and provides the data symbols to the remaining positions in the first region 382.

The number of bits 110 to provide to the data symbol mapper 350 at 434 can depend on the signal 114. For example, the number of bits per data symbol, the number of symbols to provide to the first region 382, and the number of symbol in the SOF 220 provided at 432 can depend on the signal 114. The controller 310 can determine from the signal 114 the number of bits 110 to provide to the data symbol mapper 350 and the locations in the first region 328 for the resulting data symbols. The controller 310 can provide control signals 316 in accordance with the foregoing determinations. An example of data symbols 504 being provided from the data symbol mapper 350 to the first region 382 is shown in FIG. 5A.

At 436, a sufficient number of bits 110 for mapping to support symbols for the second region 384 of the framer output 380 are provided from the frame input 330 to the support symbol mapper 360, which provides the resulting support symbols to the second region 384.

The number of support symbols to be provided to the second region 384 can depend on the signal 114. The controller 310 can determine from the signal 114 the number of bits 110 to provide to the support symbol mapper 360 and the locations in the second region 384 for the resulting support symbols. As noted, in some embodiments, the second modulation format of the support symbols can be fixed and thus not depend on the signal 114. The controller 310 can provide control signals 316 in accordance with the foregoing determinations. An example of support symbols 506 being provided from the support symbol mapper 360 to the second region 384 is shown in FIG. 5A.

At 438, a sufficient number of bits 110 for mapping to data symbols for the third region 386 are provided from the frame input 330 to the data symbol mapper 350, which provides the resulting data symbols to the third region 386.

As noted, the size (e.g., in number of symbols) of the third region 386 can depend on the signal 114. The controller 310 can determine from the state of the signal 114 the number of bits 110 to provide to the data symbol mapper 360 and the locations in the third region 328 for the resulting data symbols. The controller 310 can provide control signals 316 in accordance with the foregoing determinations. An example of data symbols 508 being provided from the data symbol mapper 350 to the third region 386 is shown in FIG. 5A.

At 484, the block index can be incremented. At 488, the first symbol block 210 created in the frame output 380 can be output onto stream 200. The method 400 can then return to 404. At step 404, this time the block index indicates the second block 210, and the method 400 branches to 410.

At 410, the controller 310 controls the framer 300 to create a regular block (the second block 210). Acts 412-416 illustrate an example of creating a regular block like the second block 210.

Figure 5B:
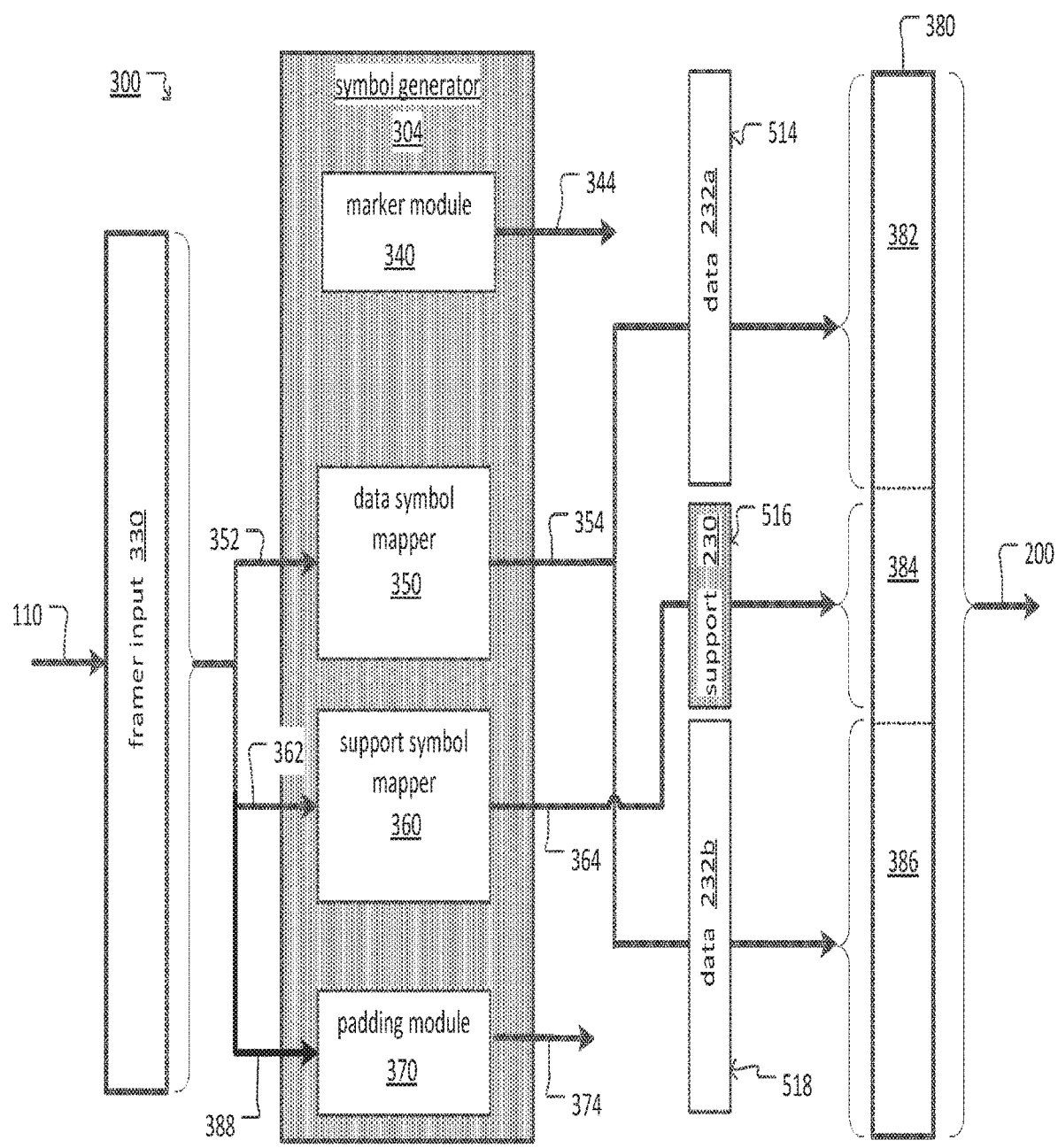

At 412, a sufficient number of bits 110 for mapping to data symbols for the first region 382 are provided from the frame input 330 to the data symbol mapper 350, which provides the resulting data symbols to the first region 382. Act 412 can be similar to 438. For example, the number of bits per data symbol as well as the number of symbols to be provided to the first region 382 can depend on the signal 114. The controller 310 can determine from the forgoing the number of bits 110 to provide to the data symbol mapper 350. The controller 310 can provide control signals 316 in accordance with the foregoing. An example of data symbols 514 being provided from the data symbol matter 350 to the first region 382 is shown in FIG. 5B.

At 414, a sufficient number of bits 110 for mapping to support symbols for the second region 384 are provided from the frame input 330 to the support symbol mapper 350, which provides the resulting support symbols to the second region 384. Act 414 can be performed in a generally similar manner as 436. An example of support symbols 516 being provided from the support symbol mapper 360 to the second region 384 is shown in FIG. 5B.

At 416, a sufficient number of bits 110 for mapping to data symbols for the third region 386 are provided from the frame input 330 to the data symbol mapper 360, which provides the resulting data symbols to the third region 386. Act 416 can be performed in a generally similar manner as 438. An example of data symbols 518 being provided from the data symbol mapper 350 to the third region 386 is shown in FIG. 5B.

At 484, the block index can be incremented. At 488, the second symbol block 210 created in the frame output 380 can be output onto stream 200. Acts 404, 412-16, 484, and 488 can be repeated to create and output into stream 200 each block 210 from the third block to the $(X-1)^{th}$ block 210. After creating the $(X-1)^{th}$ block 210, the block index is incremented at 484 to the $(X)^{th}$ block 210, and at 404, the method 400 branches to 450. At 450, the controller 310 controls the framer 300 to create the $X^{th}$ block 210. Acts 452-458 illustrate an example of creating an $X^{th}$ block 210. As shown, the $X^{th}$ block 210 can be similar to the first block 210.

Figure 5C:
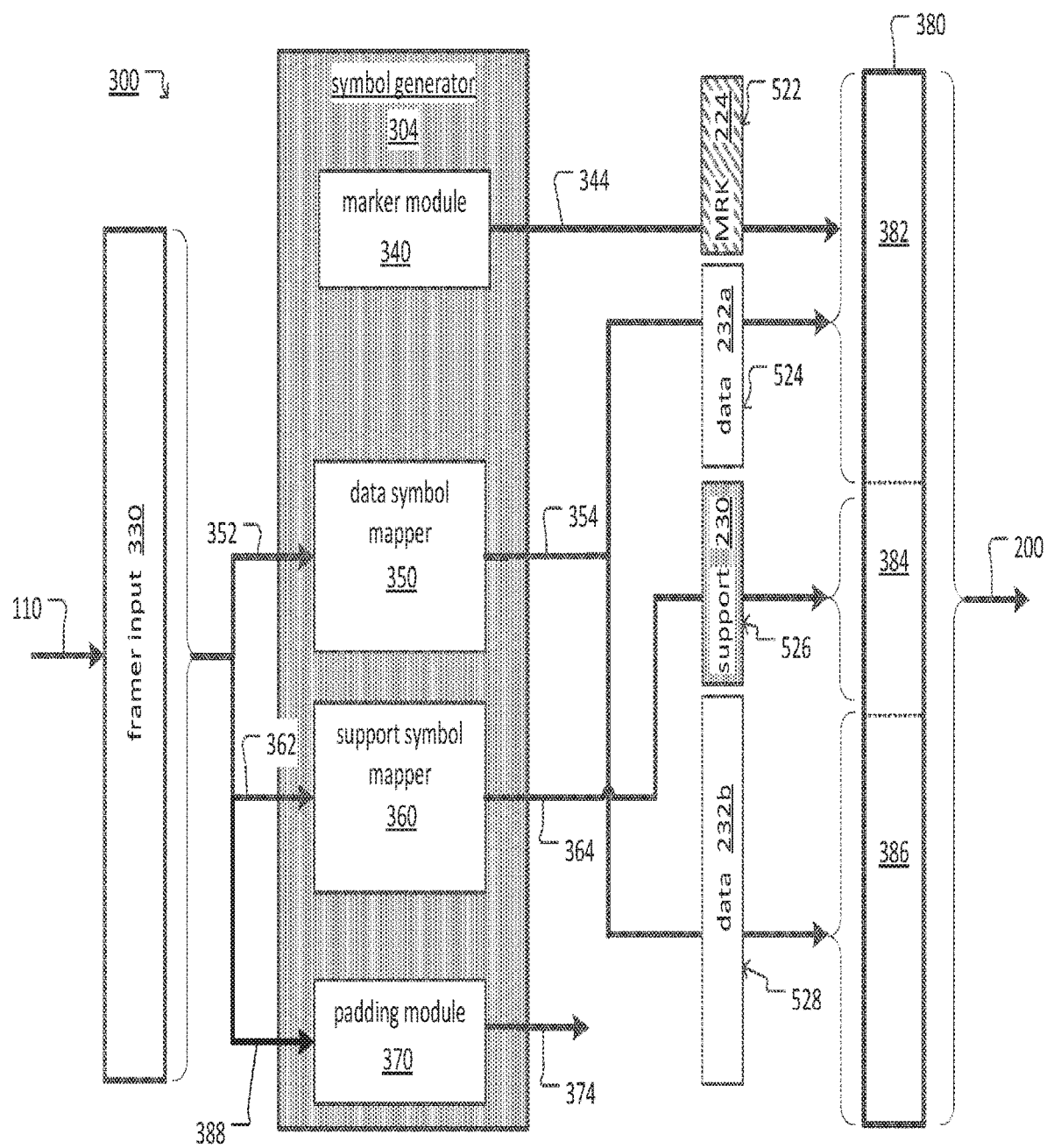

Actions 452-458 can be performed in a similar manner to 432-438 except that a MRK 224 rather than a SOF 220 is provided by the marker module 340. Examples of an MRK 224 symbol pattern 522 and data symbols 524 being provided from the marker module 340 and the data symbol mapper 350 to the first region 382, support symbols 526 being provided from the support symbol mapper 360 to the second region 384, and data symbols 528 being provided from the data symbol mapper 350 to the third region 386 are shown in FIG. 5C.

At 484, the block index can be incremented, and at 488, the $X^{th}$ symbol block 210 created in the frame output 380 can be output onto stream 200. Acts 404, 412-16, 484, and 488 can then be repeated to create and output into stream 200 each block 210 from the $(X+1)^{th}$ block to the $(Y-1)^{th}$ block 210. After creating the $(Y-1)^{th}$ block 210, the block index is incremented at 484 to the $(Y)^{th}$ block 210, and at 404, the method 400 branches to 470, where the controller 310 controls the framer 300 to create the $Y^{th}$ block 210. Acts 472-478 illustrate an example of creating a block like the $Y^{th}$ block 210.

Figure 5D:
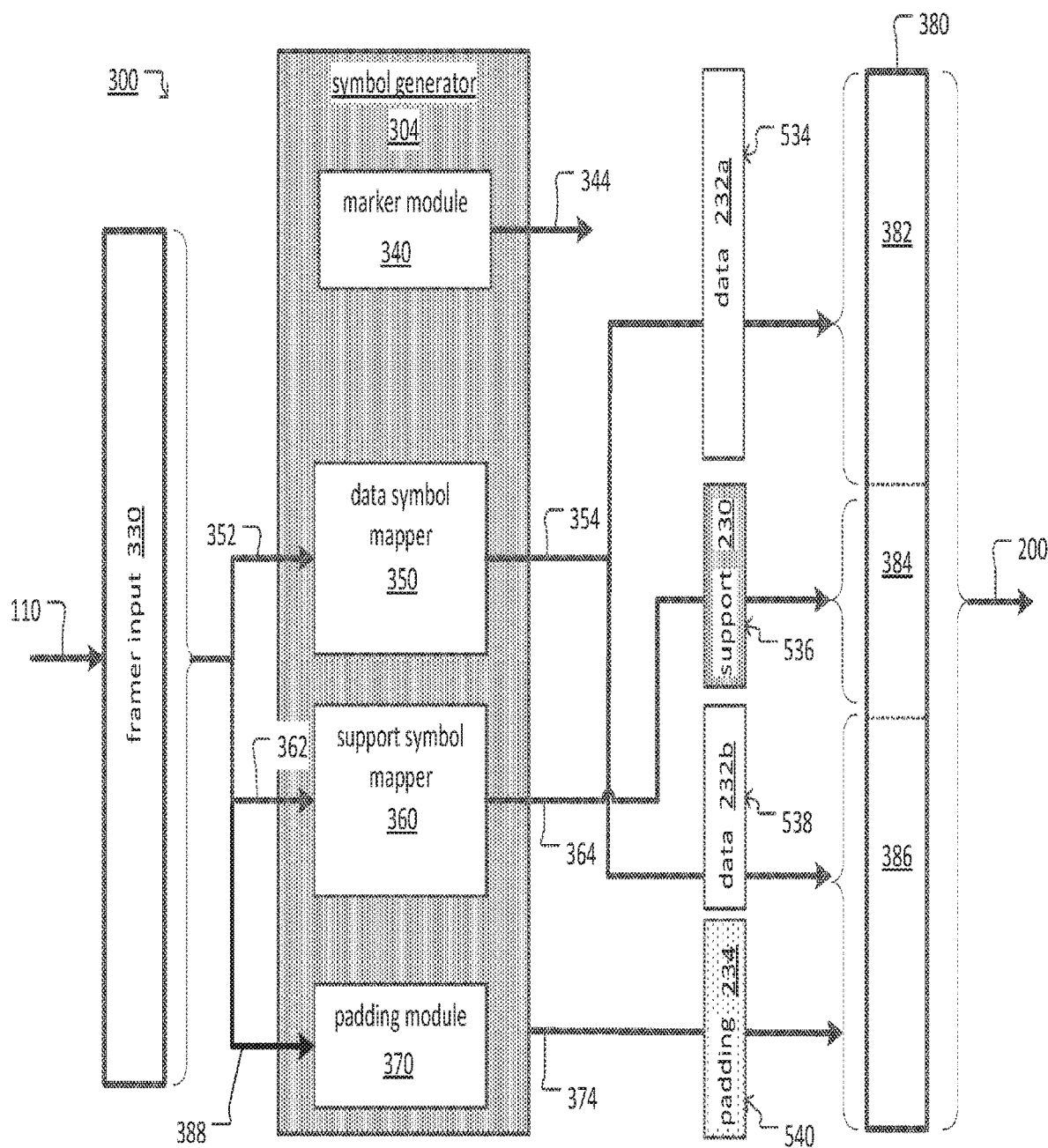

At 472, a sufficient number of bits 110 for mapping to data symbols for the first region 382 are provided from the frame input 330 to the data symbol mapper 360, which provides the resulting data symbols to the first region 382. Act 472 can be performed in a generally similar manner as 412. An example of data symbols 534 being provided from the data symbol mapper 350 to the first region 382 is shown in FIG. 5D.

At 474, a sufficient number of bits 110 for mapping to support symbols for the second region 384 are provided from the frame input 330 to the support symbol mapper 360, which provides the resulting support symbols to the second region 384. Act 474 can be performed in a generally similar manner as 436. An example of support symbols 536 being provided from the support symbol mapper 360 to the second region 384 is shown in FIG. 5D.

At 476, a sufficient number of bits 110 for mapping to data symbols for the third region 386 are provided from the frame input 330 to the data symbol mapper 350. The symbol mapper 350 maps the bits 110 to data symbols and provides the data symbols to the corresponding positions in the third region 386.

As noted, the number of bits per data symbol as well as the number of symbols to be provided to the third region 386 of the $Y^{th}$ block and the number of symbol positions to be occupied by data symbols depend on the signal 114. The controller 310 can determine from the forgoing the number of bits 110 to provide to the data symbol mapper 350 and the locations in the third region 386 for the resulting data symbols. The controller 310 can provide control signals 316 in accordance with the foregoing determinations. An example of data symbols 538 being provided from the data symbol mapper 350 to the third region 386 is shown in FIG. 5D.

At 478, the padding module 370 can provide padding to the third region 386 as discussed above. The controller 310 can determine from the signal 114 the size of the padding 234. The controller 310 can provide control signals 316 in accordance with the foregoing. An example of padding 540 being provided from the padding module 370 to the third region 386 is shown in FIG. 5D.

At 480, the block index can be reset. At 488, the $Y^{th}$ symbol block 210 created in the frame output 380 can be output onto stream 200. The method 400 has now created one of the exemplary frames 202 shown in FIG. 2. The method 400 can then return to 404 to continue generating frames 202. The frames 202 comprising blocks 210 output at 488 can be output for transmission by the transmission module 150 of FIG. 1 to a remote transmitter (not shown).

In some embodiments, a block 210 can be created substantially simultaneously in the framer output 380. For example, 412-416 can be performed substantially simultaneously to create a regular block in the framer output 380. Similarly, 432-438 can be performed substantially simultaneously to create a first block 210 in the framer output 380, and 452-458 can be performed substantially simultaneously to create an $X^{th}$ 210 block 210 in the framer output 380. Likewise, 472-478 can be performed substantially simultaneously to create an $Y^{th}$ block 210 in the framer output 380. Alternatively, some or all of the foregoing acts can be performed serially.

As noted, frame stream 200 can be an example of frame stream 112 and/or frame stream 113 of FIG. 1. In some embodiments, multiple instantiations of the framer 300 can create multiple frame streams (e.g., 112 and 113) from multiple groups of bits 110. For example, a frame stream 200 can be created from first bits (e.g., 110), resulting in frame stream 112, and a second frame stream 200 can be created from second bits (not shown but can be like bits 110), resulting in frame stream 113. In other embodiments, the framer 300 of FIG. 3 can be modified to create multiple frame streams like 200. For example, a divider (not shown) can divide the symbols output by the data symbol mapper 350 and support symbol mapper 360 between, for example, two framer outputs (not shown but each can be like 380).

The blocks 210 and frames 202 illustrated in FIG. 2 are merely examples. In other embodiments, other examples of blocks and frames can be created. For example, 410 in FIG. 4 can be an example of generating a block comprising both data symbols and support symbols; 430 and 450 can be examples of generating a block comprising a marker pattern of symbols and both data symbols and support symbols; and 470 can be an example of generating a block comprising both data and support symbols and padding.

The elements of FIG. 1 or 3 can be implemented in software, hardware (e.g., digital logic and/or analog circuits), and/or a combination of the foregoing. Any such software, for example, can reside in a digital memory (not shown) from which it is executed by the controller 310. Alternatively, one or more of the elements of FIG. 1 or 3 can comprise a processor (not shown) for executing software from a memory (not shown).

The controller 310, whether configured in software, hardware, or a combination of hardware and software, can be a separate module as illustrated in FIG. 3. Alternatively, the controller 310 can be distributed among any one or more of the other modules illustrated in FIG. 3. The method 400 illustrated by FIG. 4 can be implemented in any such configuration of software and/or the hardware as discussed above.

Although specific embodiments and applications have been described in this specification, these embodiments and applications are exemplary only, and many variations are possible. In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

We claim:

1. A method of generating, in a communications transmitter, a stream of symbol blocks, the method comprising:
   providing in a first of the symbol blocks a distinct symbol pattern identifying a start of a frame of the symbol blocks;
   providing in each of at least the first and a second of the symbol blocks a set of data symbols comprising a first set of user bits modulated in accordance with a first modulation format;
   providing in each of at least the first and the second of the symbol blocks a set of support symbols comprising a second set of the user bits modulated in accordance with a second modulation format; and
   outputting each of at least the first and the second of the symbol blocks for transmission to a remote receiver, wherein the first modulation format is of a different modulation order than the second modulation format.

2. The method of claim 1, wherein the first modulation format is of a higher order than the second modulation format.

3. The method of claim 1, wherein the first and second modulation formats are each quadrature modulation formats.

4. The method of claim 1, further comprising providing in an Xth of the symbol blocks a pattern identifying an intermediate marker of the frame of the symbol blocks.

5. The method of claim 4, wherein each of the distinct symbol pattern identifying the start of the frame and the pattern identifying the intermediate marker are provided at an approximate beginning of the first and Xth symbol blocks, respectively.

6. The method of claim 4, wherein the Xth of the symbol blocks corresponds to an approximate middle of the frame.

7. The method of claim 1, further comprising providing in a last of the symbol blocks a set of padding symbols and/or bits modulated.

8. The method of claim 7, further comprising:
   outputting the last of the symbol blocks of the frame for transmission to the remote receiver; and
   providing in a first of the symbol blocks of a next frame a distinct symbol pattern identifying a start of the next frame of the symbol blocks, a set of data symbols comprising a third set of user bits modulated in accordance with a first modulation format, and a set of support symbols comprising a fourth set of the user bits modulated in accordance with a second modulation format.

9. The method of claim 1, wherein the set of data symbols is a first set of data symbols, the method further comprising providing a second set of data symbols comprising a third set of the user bits modulated in accordance with the first modulation format.

10. The method of claim 9, wherein the set of support symbols is arranged between the first set of data symbols and the second set of data symbols in each of at least the first and the second of the symbol blocks.

11. The method of claim 1, further comprising selecting the first modulation format from a plurality of supported modulation formats based on a selected operating mode of a plurality of operating modes supported by the communications transmitter in response to an operating mode identifier signal.

12. The method of claim 11, wherein the distinct symbol pattern comprises a predetermined number of symbols corresponding to the selected operating mode.

13. The method of claim 1, further comprising modulating the frame onto an optical signal to be transmitted to the remote receiver.

14. The method of claim 1, wherein the distinct symbol pattern comprises at least one of autocorrelation and cross-correlation properties for differential decoding detection by the remote receiver.

15. The method of claim 1, wherein the distinct symbol pattern is modulated in accordance with the second modulation format or a third modulation format that is different from the second modulation format and is of a lower modulation order than the first modulation format.

16. The method of claim 1, wherein the set of support symbols in each of at least the first and the second of the symbol blocks comprises a same number of support symbols and is provided at a same location in each of at least the first and the second of the symbol blocks.

17. A system configured to output a frame of symbol blocks, the frame to be transmitted in a signal to a remote receiver, the system comprising:
a framer input configured to receive user bits; and
a symbol generator, the symbol generator comprising:
a marker module, the marker module being configured to provide a distinct symbol pattern identifying a start of a frame of the symbol blocks in a first of the symbol blocks,
a data symbol mapper being configured to provide a set of data symbols comprising a first set of the user bits modulated in accordance with a first modulation format in each of at least the first and a second of the symbol blocks; and
a support symbol mapper being configured to provide a set of support symbols comprising a second set of the user bits modulated in accordance with a second modulation format, the first modulation format being of a different order than the second modulation format.

18. The system of claim 17, wherein the first modulation format is of a higher order than the second modulation format.

19. The system of claim 17, wherein the first and second modulation formats are each quadrature modulation formats.

20. The system of claim 17, wherein the marker module is further configured to provide a pattern identifying an intermediate marker of the frame of the symbol blocks in an Xth of the symbol blocks, wherein the Xth of the symbol blocks corresponds to an approximate middle of the frame.

21. The system of claim 17, wherein the symbol generator further comprises a padding module configured to provide a set of padding symbols and/or bits modulated in accordance with the first modulation format in a last symbol block of the frame.

22. The system of claim 17, wherein the data symbol mapper is further configured to provide a third set of data symbols comprising a fifth set of the user bits modulated in accordance with the first modulation format in a third region of the first of the symbol blocks.

23. The system of claim 17, wherein the symbol generator is further configured to select the first modulation format from a plurality of supported modulation formats based on a selected operating mode of a plurality of operating modes supported by the communications transmitter in response to an operating mode identifier signal.

24. The system of claim 23, wherein the distinct symbol pattern comprises a predetermined number of symbols corresponding to the selected operating mode.

25. The system of claim 17, further comprising an optical modulator configured to modulate the frame onto an optical signal to be transmitted to the remote receiver.

26. The system of claim 17, wherein the marker module is further configured to generate the distinct symbol pattern with a predetermined set of at least one of autocorrelation and cross-correlation properties for differential decoding detection by the remote receiver.

27. The system of claim 17, wherein the support symbol mapper is further configured to modulate the distinct symbol pattern in accordance with the second modulation format or a third modulation format that is different from the second modulation format and is of a lower modulation order than the first modulation format.

28. The system of claim 17, wherein the support symbol mapper is configured to provide a same number of the support symbols in a same location in each of at least the first and the second of the symbol blocks of the frame.

* * * * *